United States Patent [19]

Berglund et al.

[11] 3,919,495

[45] Nov. 11, 1975

[54] FEEDER DISTRIBUTION INTERFACE FOR RURAL AREAS

[75] Inventors: Richard Newman Berglund, Somerville; Ved Prakash Chaudhary, Ironia; Richard Edward Kummer, New Providence, all of N.J.

[73] Assignee: Bell Telephone Laboratories, Incorporated, Murray Hill, N.J.

[22] Filed: Oct. 15, 1974

[21] Appl. No.: 514,379

[52] U.S. Cl. .................................... 179/98; 317/122

[51] Int. Cl.[2] .......................................... H04Q 1/14

[58] Field of Search ........ 179/98; 317/99, 118, 122; 339/18 C, 19

[56] References Cited

UNITED STATES PATENTS

| | | | |
|---|---|---|---|
| 3,566,004 | 2/1971 | Creedon | 179/98 |
| 3,573,373 | 4/1971 | Mullin et al. | 179/98 |
| 3,660,613 | 5/1972 | Mullin et al. | 179/98 |
| 3,846,590 | 11/1974 | McLain | 179/98 |

OTHER PUBLICATIONS

"Connective Systems : Evolving New Systems", Nicholas Osifchin, Bell Laboratories Record, Feb. 1972, Vol. 50, No. 2, pgs. 45–51.

*Primary Examiner*—Kathleen H. Claffy
*Assistant Examiner*—Randall P. Myers
*Attorney, Agent, or Firm*—A. D. Hooper; R. O. Nimtz

[57] ABSTRACT

An interface or connector for providing distribution of telephone feeder cable pairs includes first, second and third fields of connectors. The connectors in the first field can be interconnected with any connector in the third field or with an associated connector in the second field but not with both simultaneously. The connectors in the first, second and third fields are respectively connected to feeder-in cable pairs, feeder-out cable pairs and distribution pairs. Accordingly, a pair in the feeder-in cable can be made available at a plurality of interfaces but can only be used at one interface at any given time.

9 Claims, 5 Drawing Figures

FEEDER DISTRIBUTION INTERFACE FOR RURAL AREAS

BACKGROUND OF THE INVENTION

1. Field of the Invention

This invention relates to multipair cable connecting points and specifically to a connector interface between feeder cables and distribution cables.

2. Description of the Prior Art

U.S. Pat. No. 3,660,613 issued May 2, 1972 to F. J. Mullin et al. and assigned to the assignee hereof discloses a serving area connector or interface which provides significant advantages in the fanout or distribution of the pairs of large feeder cables to small distribution cables or even service wires which provide service to individual homes. This prior art interface is particularly suited for urban or relatively high density areas where pairs from the feeder cable can be dedicated to a single interface for any subsequent use. In rural areas, however, because of the long loops it is desirable to have the pairs from a feeder cable available for use at a plurality of interfaces to provide greater flexibility in providing connections to distribution pairs. Such flexibility helps eliminate the high cost of idle feeder cable pairs which have been dedicated to an interface where they are not presently needed. This increased flexibility of interconnection is also desirable in interfaces used in building wiring such as apartment and commercial buildings. However, it is also required that such increased flexibility not add significantly to the administration or records keeping for the interface. It is also desirable that such an interface utilize standard hardware to the maximum extent possible.

Accordingly, it is an object of this invention to provide greater flexibility in the interconnections between feeder cable pairs and distribution cable pairs.

SUMMARY OF THE INVENTION

The foregoing object and others are achieved in accordance with this invention by an interface which makes a group of feeder cable pairs available at a plurality of interfaces but allows use of a pair at only one interface at any time while maintaining the original central office identification of the pairs at all interfaces to simplify administration. The interface comprises a first field of input connectors which can accept either jumper wires or plug terminals, a second field of output connectors which can only accept plug terminals, such as pin or blade terminals, and a third field of distribution connectors which can accept jumper wires. Connectors in the first field are associated with respective connectors in the second field. The feeder pairs terminated on the first field of input connectors can be connected to distribution pairs terminated on the distribution connectors and thereby utilized at a particular interface by placing jumpers between the appropriate connectors. Feeder pairs not utilized at a particular interface can be made available at another interface by inserting a patch plug with plug terminals between the associated input and output connectors. The patch plug is configured to mate only with associated input and output connectors and can only be installed when the input connector is not connected to a distribution connector.

BRIEF DESCRIPTION OF THE DRAWING

The invention will be more fully comprehended from the following detailed description and accompanying drawing in which.

DETAILED DESCRIPTION

Figure 1:
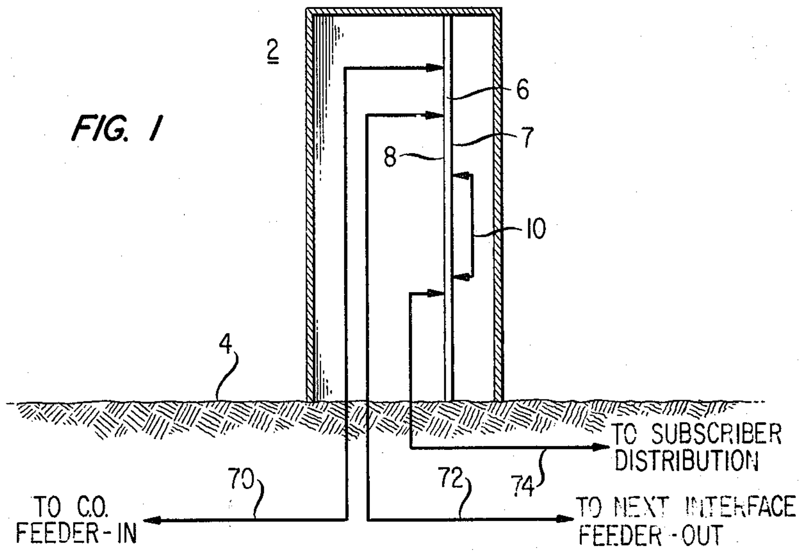
FIG. 1 is a schematic side representation of the interface of this invention.
Figures 3, 4:
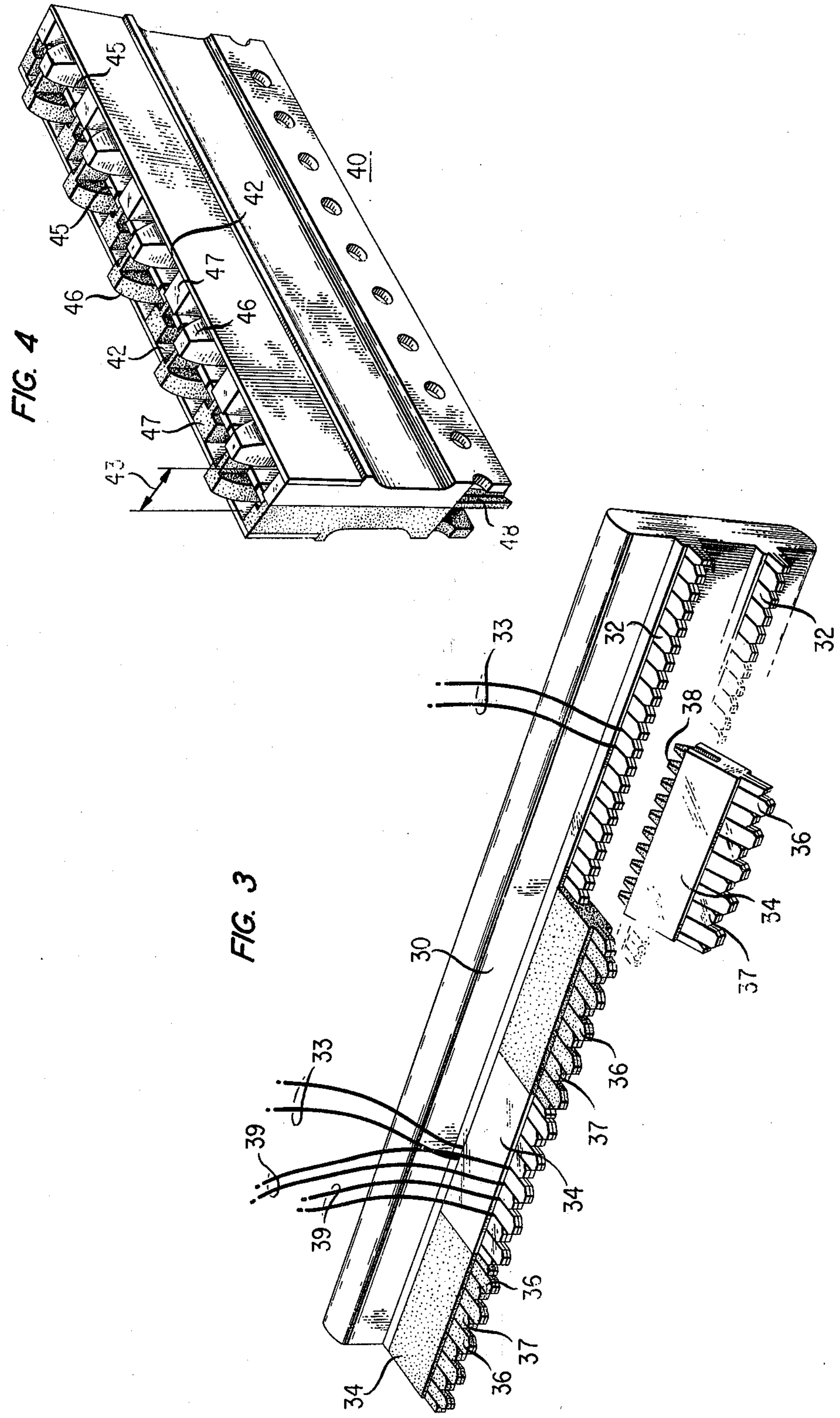
FIG. 3 is a perspective view of the one type of connector used in the interface.
FIG. 4 is a perspective view of a second type of connector utilized in the interface.

Referring now to FIG. 1 there is shown an interface 2 in accordance with this invention mounted above the ground line 4 for use with buried telephone plant. Interface 2 can also be used with above ground plant. Interface 2 includes a panel 6 therein on which connectors such as shown in FIGS. 3 and 4 are mounted. Cross connections 10 are installed on the front 7 of panel 6 and cable pairs from cables 70, 72, and 74 are terminated on the rear side 8 thereof.

Figure 2:
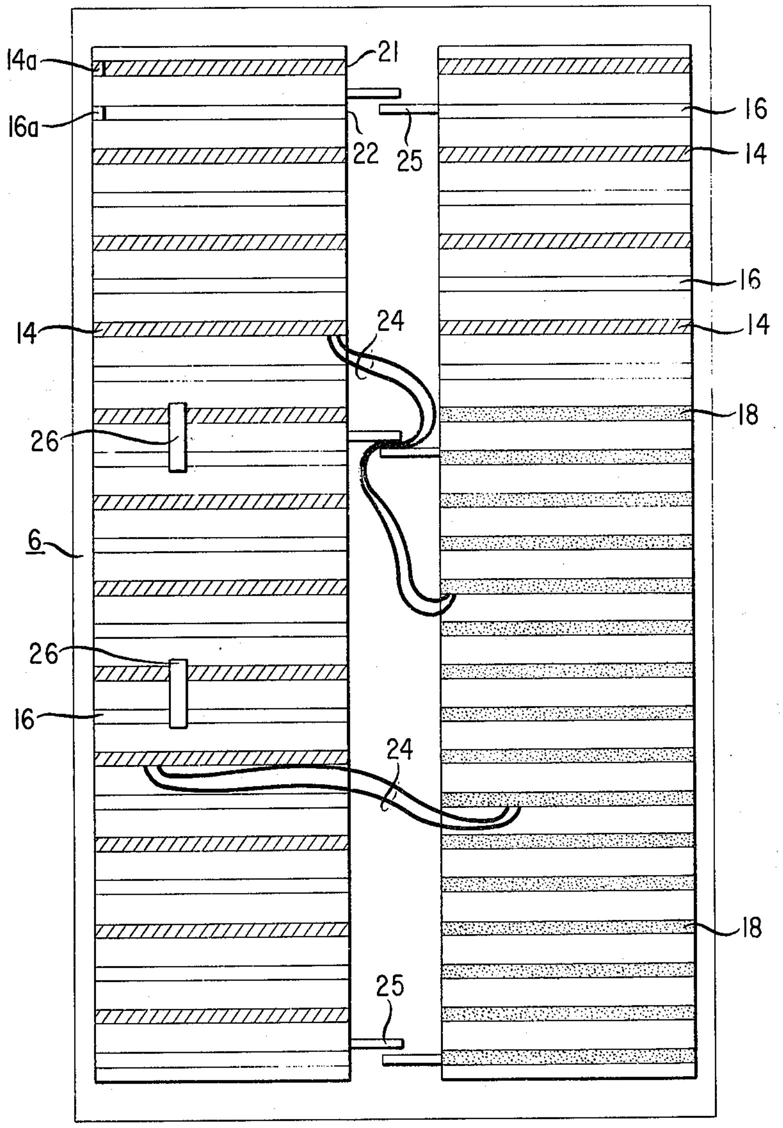
FIG. 2 is a front elevation view of the interface showing the various connections thereon.

As previously mentioned and as shown in the front view of FIG. 2, panel 6 has mounted thereon a plurality of connectors comprising input connectors or pairs of terminals 14, output connectors or pairs of terminals 16 and distribution connectors or pairs of terminals 18. Input connectors 14 and distribution connectors 18 are substantially identical and can be constructed in accordance with the teachings of U.S. Pat. Nos. 3,611,264 and 3,631,378 issued to B. C. Ellis, Jr. on Oct. 5, 1971 and Dec. 28, 1971, respectively, assigned to applicants' assignee and which are hereby incorporated by reference. As shown in FIG. 3, such connectors comprise an indexing strip 30 having a plurality of teeth pairs 32 extending from an edge or side thereof between which wires 33 to be connected are fed for indexing. Strip 30 can be mounted on panel 6 by well known mounting hardware. Connecting blocks 34 are adapted for insertion onto strip 30 so that terminals 38 extending from one edge thereof slice through the insulation of wires 33 and make contact therewith. Terminals 38 extend through insulative connecting block 34 and extend outward between long and short fingers 36 and 37, respectively, on the opposite edge thereof to be available for the insertion of jumper wires 39 plug terminals such as pins or blades or the like therein for establishing cross connections with wires 33. The pair of terminals 38 associated with a pair of long and short fingers 36 and 37, respectively, corresponds to tip and ring. Although FIG. 3 illustrates a connector block 34 having five terminal pairs or connectors it should be apparent that any desired size can be utilized.

Output connectors 16 are substantially identical to input connectors 14 and distribution connectors 18 except that the connecting blocks used therein have been modified to prevent the insertion of jumpers between long and short fingers 46 and 47, respectively, as shown in FIG. 4. Connecting blocks 40 used in output connectors 16 include spacers, fillers or side walls 42 of insulative material along the sides of fingers 46 and 47, adjacent to the split ends 45 of terminals 48. Sidewalls 42 prevent jumpers or other wires from being pressed down into the split ends 45 of terminals 48 between fingers 46 and 47 as may be done in the connector block of FIG. 3 as shown by jumpers 39. However, a pin or blade type plug terminal can be inserted into the split ends 45 of terminal 48 between walls 42 and thereby establish contact with the wire connected to terminal 48 at its opposite end which mounts onto an indexing strip 30. The only requirement is that the plug terminal have a width less than the distance 43 between the opposing inner surfaces of sidewalls 42. Although FIG. 4 illustrates a connector block 40 having five terminal pairs or connectors it should be apparent that any desired size can be utilized as was previously mentioned with respect to FIG. 3.

Referring again to FIG. 2, input connectors 14 and output connectors 16 are mounted in alternating rows on panel 6. The connectors are arranged so that each pair of terminals, i.e., tip and ring pair of terminals, in an input connector 14 is directly opposite and aligned with an associated pair of terminals, i.e., tip and ring terminals, respectively, in one of the adjacent output connectors. For example, the first or leftmost pair of terminals 14*a* in the first row 21 of input terminals is associated with and directly opposite the leftmost or first pair of terminals 16*a* in the adjacent output terminal row 22. The tip and ring terminals of an associated pair of input and output terminals are respectively aligned with each other. The distribution connectors 18 are located in a separate area of panel 6, e.g., in this embodiment in the lower right corner of panel 6.

A pair of input terminals 14 can be interconnected with a pair of distribution terminals 18, i.e., an input connector can be interconnected with an output connector by means of flexible jumper wires inserted into the terminals between fingers 36 as indicated by the pairs of wires 24 in FIG. 2. Appropriate wire guides 25 and channels known in the art can be provided along and beside the rows of connectors for dressing such wires 24.

Figure 5:
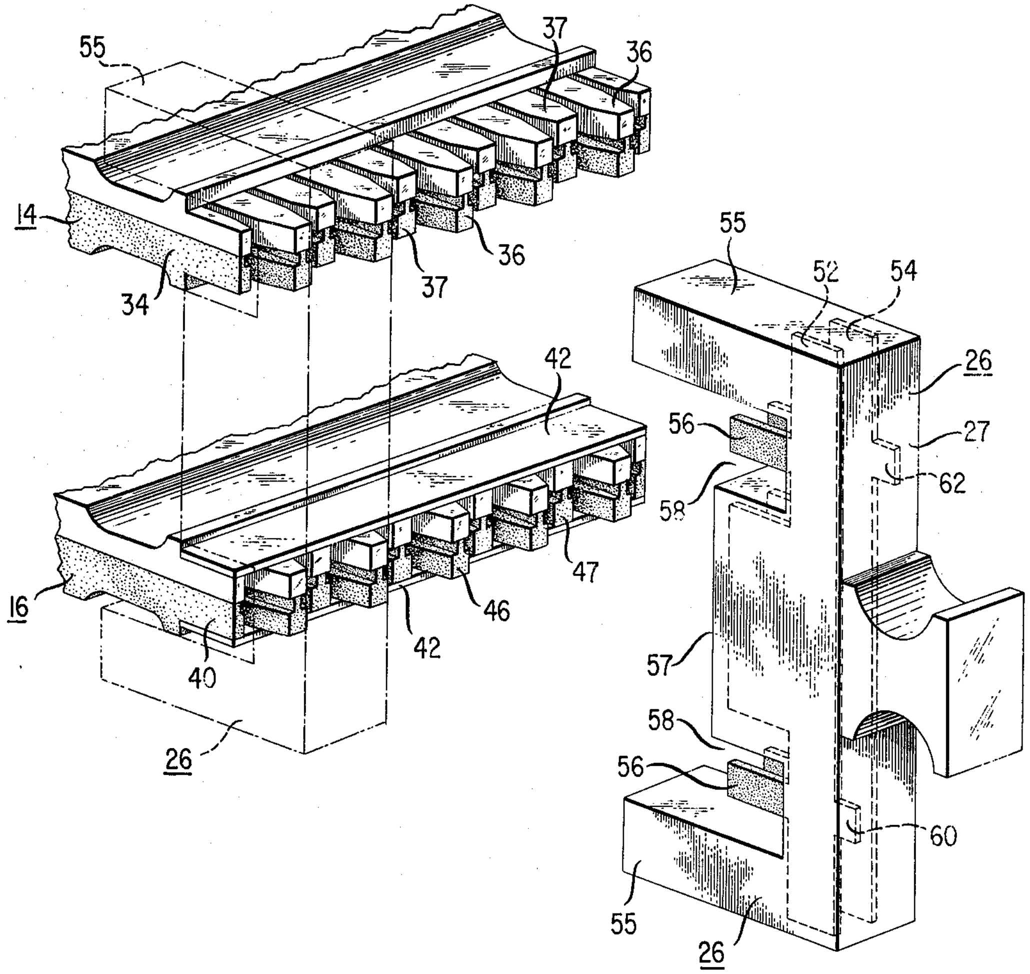
FIG. 5 is an exploded, partly broken away view of a portion of the front of FIG. 2 showing the installation of a patch plug thereon.

Input terminals 14 and respective associated output terminals 16 are interconnected by a patch plug 26 having appropriate plug terminals such as pin or blade terminals thereon. These input and output terminals cannot be interconnected by jumpers because the output terminals will not accept jumpers between fingers 46 thereof as previously discussed. FIG. 5 shows the details of a patch plug 26 and how this plug mounts into input and output connectors 14 and 16, respectively, to interconnect them. Plug 26 includes an insulative body 27 having two terminal strips 52 and 54, which can be used for tip and ring, respectively, imbedded therein. Each strip 52 or 54 includes two plug terminals such as pins or blades 56 extending therefrom into a cutout or recessed portion 58 of plug 26. When patch plug 26 is inserted over associated pairs of input and output terminals 14 and 16, respectively, plug terminals 56 enter the split ends of terminals 38 and 48 and make contact therewith thereby interconnecting the wires 33 terminated on the respective terminals. Plug terminals 56 on plug 26 are spaced and oriented in such a manner that plug 26 can only be installed between associated pairs of input and output terminals, e.g., between the first input terminal pair and first output terminal pair or between the $i^{th}$ input terminal pair and the $i^{th}$ output terminal pair. If an attempt is made, for example, to install patch plug 26 between the $i^{th}$ input connector and $j^{th}$ output connector, the plug terminals 56 would not fit within the split ends 45 of terminals 48 or within terminals 38. The plug ends 56 of the patch plug 26 are configured to mate with the long and short fingers of respective connecting blocks 34 and 40 that the tip and ring terminals of a pair cannot be separated. That is, patch plug 26 can only be so installed over an associated tip-ring pair of terminals. Patch plug 26 is symmetrical so that no top and bottom orientation is required with respect to blocks 34 and 40. Patch plug 26 cannot be installed if the input terminal of interest already includes jumper wires 24 therein. This is because the ends 55 of the patch plug 26 are prevented from fitting over the side of the connecting block 34 by the interference of the jumper wires therein. Likewise, a jumper wire cannot be installed in an input terminal 14 having a patch plug 26 already installed thereover. Thus, a particular input terminal 14 cannot simultaneously be connected to a plurality of other terminals such as both an output terminal 16 and a distribution terminal 18.

Terminal strips 52 and 54 of plug 26 have respective tabs 60 and 62 extending therefrom to be exposed at the front face of plug 26. These tabs can be used for test access to the conductor pair which is interconnected by plug 26. Plug 26 can include a corrosion preventing flexible filling such as grease like fillings known in the art in cavities 58 which seal the connection between plug 26 and respective terminals 14 and 16. The patch plug shown in FIG. 5 connects only one pair of input terminals to one pair of output terminals. However, a plug to connect any desired number of pairs of input and output terminals can be utilized.

Relatively large multipair input feeder cables 70 from a central office or wire center are looped into interface 2 and have the pairs thereof inserted in the index strips 30 of the input connectors 14 at the rear 8 of panel 6 upon initial installation of interface 2. A second output feeder cable or interconnection cable 72 which proceeds away from interface 2 toward other interfaces more remote from the central office also has the pairs thereof looped into interface 2 and terminated on the indexing strips of output connectors 16 at the rear 8 of panel 6. Distribution cables or service wires 74 from subscribers' premises are fed into or through the sides of interface 2 and similarly terminated on distribution connectors 18 at the rear 8 of panel 6.

Any distribution wire pair which is terminated on any distribution terminal pair 18 can be cross connected to any wire pair in feeder cable 70 which is terminated on an input terminal pair 14 to thereby obtain service to the central office by connecting a jumper pair between the appropriate pairs of terminals 14 and 18 as previously discussed, i.e., by installing a pair of jumpers such as illustrated by jumpers 24 in the appropriate input and distribution terminals.

Any pair in feeder cable 70 not presently needed at interface 2 can be continued to a more remote interface where it may be needed by mounting a patch plug 26 between the input connector or terminal pair 14 to which the pair is terminated and the output connector 16 on which the associated pair from feeder-out cable 72 is terminated. This pair is then continued to the next interface by feeder cable 72 where it can be utilized or continued still further. As mentioned earlier, because of the connector construction and layout a particular pair cannot be used at an interface 2, i.e., cannot be connected to a distribution pair, and simultaneously be continued to the next interface. The input connector 14 to which the feeder pair is terminated cannot be simultaneously cross connected to an output connector 16 and a distribution connector 18. However, the potential availability of a pair for use at a plurality of interfaces provides a cost effective usage of the telephone cable plant.

Because a particular input terminal pair 14 can only be cross connected with its specifically associated output terminal pair 16 and cannot be randomly cross connected to all output terminal pairs, greatly increased flexibility in use is achieved with an easy record keeping system. A wire pair retains its original central office identity throughout. For example, the blue-white colored pair of wires in feeder cables 70 and 72 are connected to the first pair of input and output terminals, respectively. Thereafter, the pairs can only be interconnected with each other if a through connection is to be made. Thus at any subsequent interface 2, the installer knows that the blue-white pair is the number one pair from the central office. This greatly improved flexibility is also achieved without extensive modification of standard hardware.

While the invention has been described with reference to a specific embodiment thereof, it is to be understood that various modifications might be made thereto without departing from its spirit and scope. For example, other types of connectors known in the art can be used for the input, output and distribution connectors. The major requirements are that such connectors be so designed that an input connector cannot simultaneously be connected to both an output connector and a distribution connector and that only associated input and output connectors can be connected.

What is claimed is:

1. Apparatus for making conductor pairs of a feeder cable available for interconnections with conductor pairs of distribution cables at a plurality of locations while limiting the actual establishment of a said interconnection between any said conductor pair of said feeder cable and any said conductor pair of said distribution cable to one of said locations at any specific time comprising in combination:

a first group of input connectors adapted to have said conductor pairs of said feeder cable terminated thereon, each of said input connectors being further adapted to receive therein either a pair of jumper wires or a pair of plug terminals at said specific time for establishing contact with a respective one of said conductor pairs of said feeder cable;

a second group of output connectors adapted to have conductor pairs of an interconnection cable connecting two of said locations terminated thereon, said output connectors being further adapted to receive therein a pair of said plug terminals at said specific time for establishing contact with a respective one of said pairs of said interconnection cable, whereby a said respective pair of said feeder cable can be interconnected with a said respective pair of said interconnection cable for continuation to another of said locations by the insertion of connector means having said pairs of plug terminals thereon between respective ones of said input and output connectors; and a third group of distribution connectors adapted to have said conductor pairs of said distribution cables terminated thereon, each of said distribution connectors being further adapted to receive therein a pair of said jumper wires for establishing contact with a respective one of said pairs from said distribution cables, whereby a said respective pair from said feeder cable can be interconnected by said pair of jumper wires with a said respective pair from said distribution cables only when said respective pair from said feeder cable is not interconnected with said respective pair from said interconnection cable.

2. Apparatus in accordance with claim 1 wherein said first group of input connectors and said second group of output connectors are arranged in alternating rows on a mounting panel with each of said input connectors being aligned in opposing relationship to an associated one of said output connectors in an adjacent one of said rows, and said third group of distribution connectors are mounted on a separate portion of said panel.

3. Apparatus in accordance with claim 2 including wire guides on said panel adapted to receive said jumper wires therein for guiding said jumper wires between said input connectors and said distribution connectors.

4. An interface for making conductor pairs of a feeder cable available for interconnections with conductor pairs of distribution cables at a plurality of locations while limiting the actual establishment of a said interconnection between any said conductor pair of said feeder cable and any said conductor pair of said distribution cables to one of said locations at any specific time comprising in combination:

a first group of input connectors adapted to have said conductor pairs of said feeder cable terminated thereon, each of said input connectors being further adapted to receive either a pair of jumper wires or a pair of plug terminals therein at said specific time for establishing contact with a respective one of said conductor pairs of said feeder cable;

a second group of output connectors adapted to have conductor pairs of an interconnection cable connecting two of said locations terminated thereon, said output connectors being further adapted to receive a pair of said plug terminals therein at said specific time for establishing contact with a respective one of said pairs of said interconnection cable;

a third group of distribution connectors adapted to have said conductor pairs of said distribution cables terminated thereon, each of said distribution connectors being further adapted to receive a pair of said jumper wires therein for establishing contact with a respective one of said pairs of said distribution cables, whereby a respective said pair from said feeder cable can be interconnected to a respective said pair from said distribution cables by said pair of jumper wires; and a patch plug including pairs of said plug terminals adapted for insertion into said input and output connectors, whereby said respective pair from said feeder cable can be interconnected with said respective pair from said interconnection cable by said patch plug when said respective pair from said feeder cable is not interconnected with said respective pair from said distribution cables to provide continuity of said pair from said feeder cable to another of said locations.

5. Apparatus in accordance with claim 4 wherein said patch plug comprises an insulative body having first and second conductive strips therein, each of said strips including first and second plug terminals extending therefrom and adapted for insertion in said input connector and said output connector, respectively, to make contact with one conductor of said pair from said feeder cable and one conductor of said pair from said interconnection cable, respectively, whereby said patch plug interconnects a conductor pair from said feeder cable with a conductor pair from said interconnection cable.

6. Apparatus in accordance with claim 5 wherein said first group of input connectors and said second group of output connectors are arranged in alternating rows on a mounting panel with each said input connector being aligned in opposing relationship to an associated one of said output connectors in an adjacent one of said rows, and said third group of distribution connectors are mounted on a separate portion of said panel; and said plug terminals of said patch plug and said input and output connectors have configurations and spacings which allow said patch plug to be mounted only between said associated ones of said input and output connectors.

7. Apparatus in accordance with claim 6 wherein said patch plug is symmetrical so that said patch plug can be mounted between said associated input and output connectors in either of two orientations.

8. Apparatus in accordance with claim 5 wherein said first and second conductive strips have test tabs extending therefrom to be accessible on the exterior of said insulative body whereby test access to said pairs can be obtained.

9. A distribution interface for telephone cables comprising:

a field of input feeder connectors for terminating the conductors of an input feeder cable;

a field of output feeder connectors for terminating the conductors of an output feeder cable;

the connectors of said output feeder connector field corresponding on a one-for-one basis with the connectors of said input feeder connector field;

a field of distribution connectors for terminating distribution conductors;

first connection means for connecting any connector of said input feeder connector field to any connector of said distribution connector field, said first connection means being incapable of connection to any connector of said output feeder connector field; and second connection means for connecting any connector of said input feeder connector field only to the corresponding connector of said output feeder connector field;

said first and second connection means having structurally interfering elements preventing their simultaneous connection to the same connector of said input feeder connection field.

* * * * *